United States Patent [19]

Little

[11] 4,341,030
[45] Jul. 27, 1982

[54] HUNTING DOG TRAINING DEVICE
[75] Inventor: Ronald L. Little, Lakewood, Calif.
[73] Assignee: Little Launcher, Inc., Irvine, Calif.
[21] Appl. No.: 149,574
[22] Filed: May 14, 1980
[51] Int. Cl.³ ............................................. F41C 27/06
[52] U.S. Cl. ...................................................... 42/1 F
[58] Field of Search .......................... 42/1 F; 102/483; 119/29

[56] References Cited
U.S. PATENT DOCUMENTS

| | | | |
|---|---|---|---|
| 2,432,539 | 12/1947 | Olsen | 42/1 F |
| 2,883,781 | 4/1959 | Harvey | 42/1 F |
| 3,004,360 | 10/1961 | Johnson | 42/1 F |
| 3,007,271 | 11/1961 | Brandt | 42/1 F |
| 3,176,422 | 4/1965 | Harris | 42/59 |
| 3,186,119 | 6/1965 | Maras et al. | 42/1 F |
| 3,243,909 | 4/1966 | Kotikov | 42/1 F |
| 3,392,469 | 7/1968 | Dubini | 42/1 F |
| 3,415,438 | 12/1968 | De Caro | 42/1 R |
| 3,496,580 | 2/1970 | Gulmon et al. | 42/1 F |
| 3,505,926 | 4/1970 | Johnson | 42/1 F |
| 3,534,492 | 10/1970 | Amster | 42/1 F |
| 3,618,244 | 11/1971 | Johnson | 42/1 L |
| 3,623,257 | 11/1971 | Ray | 42/71 R |
| 3,656,399 | 4/1972 | Hill | 42/1 F |
| 3,672,084 | 6/1972 | Pachmayr | 42/71 P |
| 3,713,394 | 1/1973 | Dare | 42/1 F |
| 3,717,946 | 2/1973 | Chavee | 42/1 F |
| 3,731,418 | 5/1973 | Birkenhagen et al. | 42/75 B |
| 3,981,225 | 9/1976 | Smith et al. | 42/1 F |
| 4,098,015 | 7/1978 | Walbe | 42/1 F |
| 4,154,013 | 5/1979 | Stilwell | 42/1 F |

FOREIGN PATENT DOCUMENTS 127231 11/1919 United Kingdom ................. 42/1 F

Primary Examiner—Charles T. Jordan
Attorney, Agent, or Firm—Lockwood, Dewey, Alex & Cummings

[57] ABSTRACT

Devices are provided for modifying firearms to make them suitable for use in training hunting dogs to follow game birds in flight and retrieve them while at the same time acclimating the dogs to the sound and smell of gunfire, the improved devices including a shaft having a multiple groove and removable O-ring construction providing a versatile and variable launch impetus to a launched projectile and more consistent, improved launching action, whether under wet or dry conditions.

14 Claims, 5 Drawing Figures

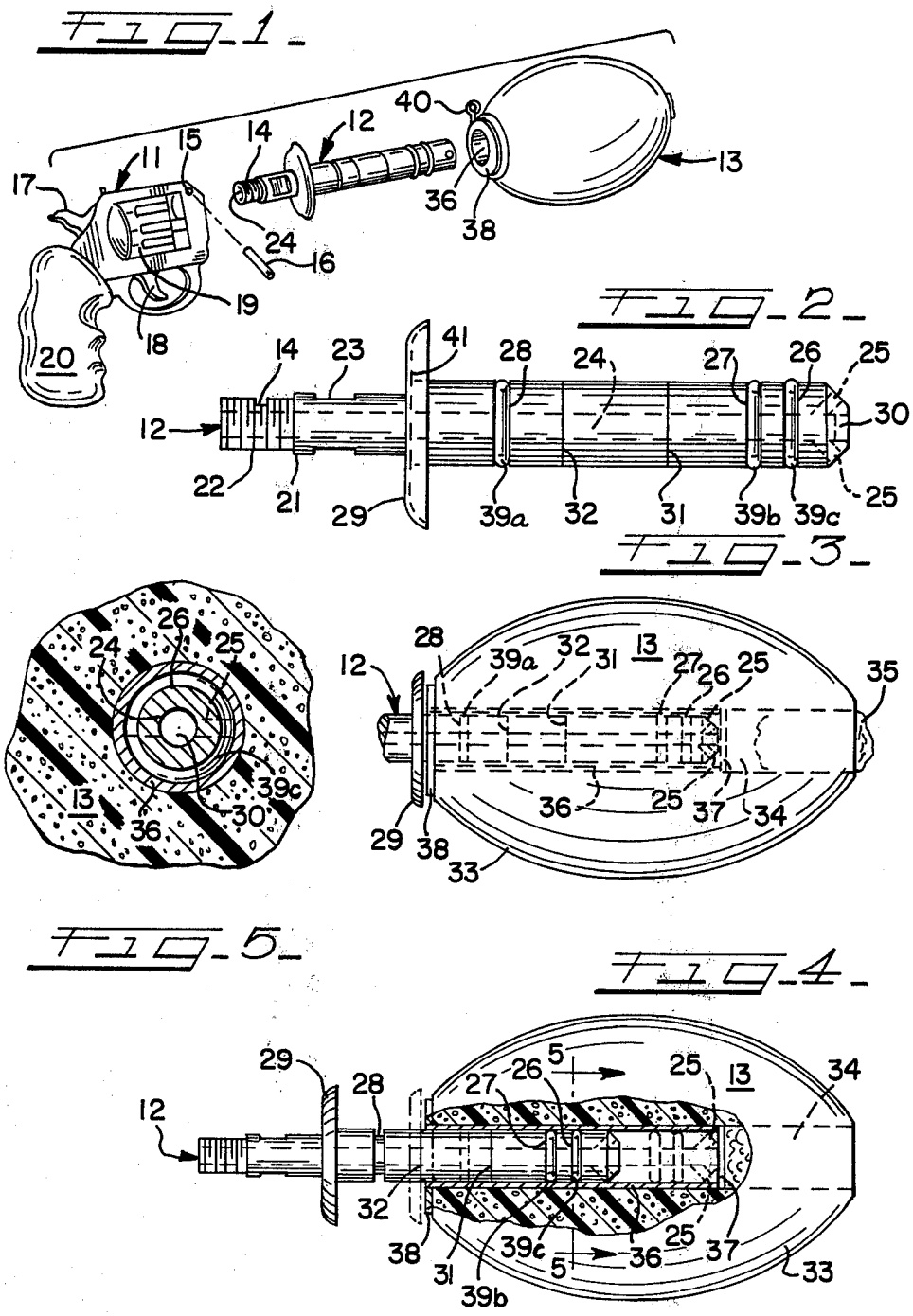

HUNTING DOG TRAINING DEVICE

BACKGROUND AND DESCRIPTION OF THE INVENTION

The present invention relates generally to improvements in launching device attachments for firearms, more particularly to devices for modifying hand-held firearms with a replacement barrel that serves as a launching shaft for a simulated game bird projectile. In an important aspect of the invention, the shaft includes a plurality of grooves at preselected locations therealong, which grooves receive O-rings as desired in order to vary the distance that the projectile is launched and in order to minimize launch distance reduction when the devices are operated under wet conditions.

Over the years, numerous devices have been proposed or utilized in training hunting dogs, particularly retriever dogs, in order to build the animal's experience and confidence in a variety of retrieving situations and under numerous naturally occurring conditions, including those involving either or both land or water terrain, which devices significantly enhance the limited degree of training possible when a trainer merely throws a dummy or other object by hand in order to generally simulate the trajectory of game birds to be retrieved.

Exemplary of devices of this general type are those illustrated in U.S. Pat. Nos. 3,004,360 and 4,098,015, these patents showing devices in which the retriever training gun has a specially designed firing mechanism construction, as opposed to using the firing mechanism of a readily available 0.22 caliber handgun, such as those designed to fire blank cartridges for use as starter's pistols for sporting events. Typically, these specially made firing mechanisms are not as durable or reliable as those of blank pistols.

Publications illustrating devices for modifying handguns for the purpose of throwing projectiles such as targets or the like include U.S. Pat. Nos. 3,186,119 and 3,717,946. Devices of these several types are not particularly well suited for easily and quickly varying the trajectory distance so as to be suitable for training dogs at different levels of ability, competence, and training progress.

Shortcomings of the character discussed hereinbefore are substantially eliminated by the present invention which provides means for modifying a firearm such as a starter's pistol, said means including a replacement barrel or launching shaft having a plurality of grooves located at predetermined sites therealong for the purpose of providing, by the selective placement of O-rings therewithin and by varying the extent that the launching shaft is inserted into the projectile, launching forces of variable magnitudes, which launching forces are imparted to a projectile having a generally axially disposed cylinder for receiving the launching shaft.

It is accordingly a general object of this invention to provide an improved launching device.

Another object of this invention is to provide an improved launching shaft as a replacement for the barrel of a handgun such as one of the type used for firing blank cartridges at sporting events.

Another object of the present invention is to provide an improved retriever dog training device that is acceptable for operation by one hand and that has little recoil.

Another object of the present invention is to provide an improved retriever training device that can be utilized for a plurality of retrievals without having to reload the firing mechanism.

Another object of this invention is an improved device that incorporates three different functions, including providing the sound, sight and scent of a firearm, the launching of a retrievable dummy, and use as a blind retrieval planter.

Another object of this invention is an improved means for imparting a variety of launch distances as desired, such distances being determined accurately and being accomplished in a manner that is readily repeated for training purposes.

Another object of the present invention is to provide an improved retriever dog training device that is suitable for use under a variety of weather and terrain conditions in which the device may become wet or remain dry during usage.

Another object of this invention is an improved launching shaft that is compatible with a variety of projectiles designed for use with launching devices in which blank cartridges are discharged to supply expanding gases for launching the projectiles.

These and other objects of the present invention will be apparent from the following detailed description of the preferred embodiment of this invention, taken in conjunction with the accompanying drawings, wherein:

FIG. 1 is a perspective, exploded view showing the in-use application of the present invention, including the triggering and chamber mechanism of a blank cartridge revolver, the barrel thereof having been replaced with the launching shaft of the present invention, shown positioned for receiving a projectile in accordance with this invention;

FIG. 2 is an elevational view of the preferred launching shaft according to this invention;

FIG. 3 is an elevational view of a launching shaft and projectile combination according to this invention, this combination being one in which launch distance is achieved while inserting the launching shaft entirely into the projectile;

FIG. 4 is an elevational view illustrating another launching shaft and projectile combination according to this invention, this combination being one in which long, medium-range, and short launch distances are attained by varying the extent that the launching shaft is inserted into the projectile; and FIG. 5 is a cross-sectional view along the line 5—5 in FIG. 4.

In FIG. 1, a hand-held revolver, generally designated by reference numeral 11, is illustrated in combination with a preferred launching shaft or barrel, generally designated as 12, positioned for receiving a projectile, generally identified as 13. Projectile 13 is projected through the air when gases from a discharged blank shell expand out of revolver 11, through launching shaft 12, and into the projectile 13.

Revolver 11 is of standard construction, except that its barrel (not shown) has been removed therefrom and replaced with the launching shaft 12 which is designed to have threads on one end thereof, such threads being of the same sizing as those of the removal barrel and complementary with those within the forwardmost portion of the frame of revolver 11. Launching shaft 12 also includes a locking pin groove 14 which is located to be in precise alignment with a retaining pin bore 15, groove 14 and bore 15 being sized for receiving a retaining pin 16 for securing the launching shaft 12 into the frame of the revolver 11. When so positioned, the revolver 11 can be used in its initially designed manner by using the trigger 17 and hammer 18 to rotate the cylinder 19 and fire a blank cartridge positioned within the top chamber of the cylinder 19 in order to provide rapidly expanding gases and to direct those expanding gases into and through the launching shaft 12 and to the projectile 13 in order to launch same as desired. To provide enhanced control, enlarged and hand-contoured grips 20 can replace the standard grips (not shown) of the revolver 11.

Further details of the preferred launching shaft 12 can be seen from FIG. 2. A mounting portion 21 of the launching shaft 12 includes threads 22 for securing the mounting shaft 12 to the revolver 11. Also preferably provided for assisting in secure attachment of the launching shaft 12 into the revolver 11, is a wrench receiving means, typically in the form of flats 23 for receiving a wrench in order to rotate the launching shaft 12 and its threads 22 into the body of the revolver 11.

Launching shaft 12 has a longitudinal bore 24 therethrough, preferably along the longitudinal axis of the shaft 12. Bore 24 includes two or more secondary bores or vent openings 25 in order to provide even, controlled transmission of the expanding blank cartridge gases into the projectile 13.

FIG. 2 illustrates two vent openings 25, disposed generally perpendicularly to each other within substantially the same planes, such that the expanding gases leave the openings 25 at about a 45° angle with respect to the axis of the shaft 12. If desired, three, four or more vent openings could be located within the extreme end of the launching shaft 12, provided such plurality of vent openings 25 are substantially equally spaced from each other so as to provide a uniform distribution of the expanding gases into the projectile 13. Such an arrangement reduces binding and the development of undesirable friction when forces are applied by the expanding gases onto the projectile 13 as the gases pass through bore 24 and are directed out of openings 25 by an end plug 30.

Launching shaft or barrel 12 includes a plurality of radially extending annular grooves 26, 27, 28 spaced along launching shaft 12 at preselected locations between the discharge end having the plug 30 and vent openings 25 and a skirt member or gas shield 29 positioned along launching shaft 12 at a location toward the mounting portion 21 of the shaft 12. Also preferably located along the launching shaft 12 are one or more index markings 31, 32.

Projectile 13 preferably has a substantially streamlined body 33, such as that depicted in FIGS. 3 and 4, which is generally elliptical in cross-section. It is also relatively light in weight, being typically constructed of closed-cell flexible foam. The projectile 13 can optionally include, as shown, a pocket 34 for receiving a scent carrying insert 35, which may be a sponge or the like, and an eye 40 for attaching a line to the projectile 13 to facilitate its recovery or for utilizing projectile 13 as a rescue buoy.

Longitudinally positioned within the projectile 13, typically along the longitudinal axis thereof, is a rigid sleeve 36 having a mouth and an internal surface generally complementary with and only slightly oversized with respect to the outside surface of the launching shaft 12 so as to provide a snug, but not a binding, fit between the launching shaft 12 and the sleeve 36. The preferred projectile 13 includes a rigid plug member 37 at the far end of the sleeve 36 opposite its mouth, the sleeve 36 and the plug member 37 being rigidly secured to each other so as to provide a gas-tight seal therebetween and a substantially gas-tight compartment defined by said sleeve 36 and said plug 37, said compartment, and especially the rigid plug member 37 thereof, serving as a force receiving and force direction-reversing member when the expanding gases are rapidly passed thereinto through the openings 25.

In order to enhance the unit strength of the projectile 13, especially during the violent gas expansion conditions to which the device is subjected, securely fastened to both the sleeve 36 and the body 33 of the projectile 13 is a retainer member 38, which is washer-shaped in the preferred embodiment so as to generally conform to the shape of the body 33 and permit close passage of the launching shaft 12 therethrough.

The versatility and adjustability aspects of this invention are due in large measure to the provision of and location of the plurality of radially extending grooves 26, 27, 28 and whether or not each of said grooves has an O-ring 39 therewithin, as well as the location of the index markings 31, 32 and how far the launching shaft 12 is inserted into the projectile 13. These variables combine to various degrees to determine the length of the launching stroke, such stroke being defined generally as the distance between the inside surface 41 of the gas shield 29 and an O-ring 39. All other conditions being equal, the longer this launching stroke length, the greater the distance that the projectile 13 is thrust when a blank cartridge is discharged within revolver 11.

Each O-ring 39 is sized to fit within one of the grooves 26, 27, 28 and be compressed by the inside surface of the rigid sleeve 36 when a projectile 13 is mounted onto the launching shaft 12, each O-ring being structured of a material such as neoprene or the like which can be compressed and is elastic enough to impart and maintain a holding force upon the rigid sleeve 36.

An especially short stroke length is illustrated in FIG. 3, wherein only one O-ring 39a is used, it being within groove 28, the groove closest to the gas shield 29. Expanding gases passing through longitudinal bore 24 and out of openings 25 impinge upon rigid plug member 37 and pass between the outside surface of launching shaft 12 and the inside surface of the rigid sleeve 36 until they are substantially stopped by the O-ring 39a, to develop a launching force that is generally equal and opposite in direction to the force with which the gases meet the O-ring 39a, this launching force being imparted until the O-ring 39a leaves the rigid sleeve 36 when the projectile 13 is being launched, the launching force being present throughout the short launching stroke length illustrated in FIG. 3.

FIG. 4 depicts several different stroke lengths, including the combination utilized to attain the longest stroke length, which is the combination shown in phantom wherein the pair of grooves 27 and 26 farthest from the gas shield 29 have O-rings 39b and 39c, respectively, therewithin. The movement of expanding gases is the same as defined for the shoft length shown in FIG. 3, except the launching force is developed when the gases are stopped by the pair of O-rings 39c and 39b, thereby providing a much longer launching stroke than that of FIG. 3 to increase the time that the launching force is imparted to the projectile 13 and thus increase the launch distance developed for a substantially equal quantity of expanding gas.

Double O-rings 39b and 39c enhance the projection of launch distance attained by this structure by significantly decreasing blow-by of gases to ensure that substantially all of the expanding gases are transmitted into launching forces. Some expanding gases will blow by O-ring 39c, and substantially all of these blow-by gases will be stopped by O-ring 39b to contribute to the forces that are transformed into launching energy.

This double O-ring and double groove construction likewise significantly improves operation under wet conditions, at which times a non-compressible water film is present within the rigid sleeve 36 and on the plug member 37 as well as on the shaft 12 and the pair of O-rings. Particularly troublesome is moisture between the O-rings and the plug member 37, this moisture, due greatly to the fact that it cannot be compressed, being forced by the expanding gases into the space between the shaft 12 and sleeve 36 until it blows by and simultaneously undesirably opens up and lubricates the compression fit between O-ring 39c and the sleeve 36, thereby permitting passage of gases through O-ring 39c which, under dry conditions, would be transformed into launching energy. It has been observed that if but a single O-ring, such as 39c is utilized and the second O-ring 39b is omitted, wet conditions will reduce launch distance to only about 40 percent of the launch distance under dry conditions. Providing the O-ring pairs 39c and 39b has been discovered to significantly eliminate this wet-conditions launching distance reduction.

An intermediate launch distance can be attained with the structure of FIG. 4, as illustrated by the solid lines thereof, by not inserting launching shaft 12 fully within the sleeve 36, but only as far as the index marking 32 closest to the gas shield 39 to thereby shorten the launching stroke without having to remove either or both of the O-rings 39b, 39c, which is useful when wishing to provide a variety of launch distances to train dogs of varying ability or training or to train a single dog to follow widely differing trajectories. By inserting shaft 12 only as far as index marking 31, an even shorter launching stroke is provided (not shown) without having to remove O-rings 39b, 39c.

It will be apparent to those skilled in this art that the present invention can be embodied in various forms; accordingly, the invention is to be construed and limited only by the scope of the appended claims.

I claim:

1. A hunting dog training device having a readily adjustable launching stroke length, comprising:
a launching shaft having an outside surface, a discharge end, and a mounting end, said launching shaft having a longitudinal bore therethrough beginning at its mounting end and terminating in a plurality of vent openings at its discharge end, said longitudinal bore being in gas-passing communication with means for discharging a blank cartridge into the mounting end, through the longitudinal bore, and out of said plurality of vent openings, said launching shaft having a plurality of grooves on its said outside surface;
a projectile having a body and a rigid sleeve generally along its longitudinal axis, said rigid sleeve having a mouth and an internal surface generally complementary in shape and slightly oversized with respect to said outside surface of the launching shaft, said rigid sleeve having a rigid plug member at its end opposite its said mouth, said projectile being mounted onto said launching shaft by means of said projectile rigid sleeve, and said projectile includes a scent carrying insert within a pocket of said projectile; and
one or more O-rings nested within one or more of said plurality of grooves on the outside surface of the launching shaft, each said O-ring being extended beyond said launching shaft outside surface and being in sealed contact with said internal surface of the projectile.

2. The training device of claim 1, wherein said plurality of grooves on said launching shaft include a pair of closely spaced grooves near the discharge end thereof and a single groove near the mounting end thereof.

3. The training device of claim 1, wherein said launching shaft includes a gas shield skirt member near the mounting end thereof, and wherein said plurality of grooves on said launching shaft include a pair of grooves closely spaced from the discharge end thereof and a single groove closely spaced from said gas shield skirt member between said skirt member and said pair of grooves.

4. The training device of claim 1, wherein one or more index markings are located on said outside surface of the launching shaft between one of said plurality of grooves toward the mounting end of the launching shaft and a pair of said plurality of grooves closely spaced from the discharge end of the launching shaft.

5. The training device of claim 1, wherein said means for discharging a blank cartridge is a firearm from which its barrel has been removed and replaced with said launching shaft.

6. The training device of claim 1, wherein each of said plurality of vent openings at the discharge end of the launching shaft has a longitudinal axis that is approximately 45° from said longitudinal bore of the launching shaft.

7. The training device of claim 1, wherein said plurality of vent openings at the discharge end of the launching shaft are spaced substantially equally from each other.

8. The training device of claim 1, wherein said projectile includes a retainer member securely fastened to said body and said rigid sleeve of the projectile.

9. The training device of claim 1, wherein said device has a plurality of launching stroke lengths, each being the distance measured from said mouth of the projectile rigid sleeve to one of said O-rings, wherein a shortest of said launching stroke lengths is determined by one O-ring positioned between a gas shield skirt member of said launching shaft that generally overlies said mouth of the projectile and a pair of O-rings nearer to the discharge end of the launching shaft, a longest of said launching stroke lengths is determined by said gas shield and said pair of O-rings, and one or more intermediate launching stroke lengths each of which is determined by said pair of O-rings and an index marking on the outside surface of said launching shaft between said one O-ring and said pair of O-rings.

10. A launching shaft for a training device having a readily adjustable launching stroke length, comprising:
an outside surface, a discharge end, a mounting end, a gas shield skirt member closely spaced from said mounting end, a longitudinal bore through the launching shaft from said mounting end to a plurality of vent openings at said discharge end, said launching shaft being mountable onto a firearm as a replacement for the barrel of said firearm, said outside surface having a projectile mountable thereon that has a scent carrying insert within a pocket thereof, said outside surface having a plurality of grooves thereon between said gas shield skirt member and said discharge end, one or more O-rings nested within one or more of said plurality of grooves and projected beyond said outside surface of the launching shaft.

11. The launching shaft of claim 10, wherein said plurality of grooves include a pair of grooves near the discharge end and a groove between said gas shield skirt member and said pair of grooves that is closer to said skirt member than said pair of grooves.

12. The launching shaft of claim 10, wherein one or more index markings are located on said outside surface at a location between one groove and a pair of grooves, said pair of grooves being between said discharge end and said one or more index markings and being closely spaced from the discharge end, said one groove being between said gas shield skirt member and said one or more index markings.

13. The launching shaft of claim 10, wherein each of said plurality of vent openings at the discharge end has a longitudinal axis that is approximately 45° from said longitudinal bore of the launching shaft.

14. The launching shaft of claim 10, wherein said plurality of vent openings at the discharge end are spaced substantially equally from each other.

* * * * *